US012439186B2

(12) United States Patent
Chen (10) Patent No.: US 12,439,186 B2
(45) Date of Patent: Oct. 7, 2025

(54) OPTICAL TRANSMISSION SYSTEM AND OPTICAL MATRIX

(71) Applicant: ACON OPTICS COMMUNICATIONS INC., New Taipei (TW)

(72) Inventor: Lung-Chang Chen, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 553 days.

(21) Appl. No.: 17/564,167

(22) Filed: Dec. 28, 2021

(65) Prior Publication Data

US 2023/0053020 A1    Feb. 16, 2023

(30) Foreign Application Priority Data

Aug. 10, 2021    (TW) .................. 110129452
Aug. 10, 2021    (TW) .................. 110129453
Aug. 10, 2021    (TW) .................. 110129454

(51) Int. Cl.
*H04Q 11/00*       (2006.01)
*H04B 10/50*       (2013.01)

(52) U.S. Cl.
CPC ....... *H04Q 11/0005* (2013.01); *H04B 10/501* (2013.01); *H04Q 2011/0039* (2013.01); *H04Q 2011/0058* (2013.01)

(58) Field of Classification Search
CPC .................. H04Q 11/0005; H04Q 11/0007
See application file for complete search history.

(56) References Cited

U.S. PATENT DOCUMENTS

| | | | | |
|---|---|---|---|---|
| 5,111,323 A | * | 5/1992 | Tanaka ............... | H04Q 11/0005 398/100 |
| 6,195,187 B1 | * | 2/2001 | Soref ................. | G02B 6/29395 398/9 |
| 2007/0233906 A1 | | 10/2007 | Tatum et al. | |
| 2012/0249871 A1 | | 10/2012 | Nguyen et al. | |

(Continued)

FOREIGN PATENT DOCUMENTS

| | | |
|---|---|---|
| CN | 207399385 | 5/2018 |
| CN | 110351510 | 10/2019 |
| CN | 110351510 A * | 10/2019 |

OTHER PUBLICATIONS

CN110351510A translation (Year: 2019).*

(Continued)

*Primary Examiner* — Chad H Smith
(74) *Attorney, Agent, or Firm* — JCIPRNET (57) ABSTRACT

The disclosure provides an optical transmission system and an optical matrix. The optical transmission system includes a first optical transmitter, an optical matrix, and a first optical receiver. The first optical transmitter receives a first video electrical signal corresponding to a first video standard, and converts the first video electrical signal into a first optical signal at a specified transmission rate. The optical matrix is used to receive and forward the first optical signal. The first optical receiver receives the first optical signal at the specified transmission rate forwarded by the optical matrix, and converts the first optical signal into a second video electrical signal corresponding to a second video standard.

14 Claims, 7 Drawing Sheets

(56) References Cited

U.S. PATENT DOCUMENTS

2014/0016032 A1 1/2014 Chou
2015/0256790 A1 9/2015 Priest

OTHER PUBLICATIONS

Chen Xiaoli, "Verizon in the United States successfully completed the actual measurement of 10Gbps optical fiber network", with English translation thereof, Aug. 12, 2015, Available at: https://www.ithome.com.tw/news/98043.
"Office Action of Taiwan Counterpart Application", issued on Mar. 4, 2022, p. 1-p. 6.
Extron, "FOX Matrix 3200", Wayback machine, Nov. 2, 2021, https://web.archive.org/web/20211102203645/https://www.extron.com/product/fox4gmatrix3200.
"Office Action of Taiwan Counterpart Application, Application No. 110129454", issued on Jun. 30, 2022, p. 1-p. 9.
"Office Action of Taiwan Counterpart Application, Application No. 110129453", issued on Jul. 21, 2022, p. 1-p. 7.

* cited by examiner

OPTICAL TRANSMISSION SYSTEM AND OPTICAL MATRIX

CROSS-REFERENCE TO RELATED APPLICATION

This application claims the priority benefit of Taiwan application serial no. 110129453, filed on Aug. 10, 2021, Taiwan application serial no. 110129454, filed on Aug. 10, 2021, and Taiwan application serial no. 110129452, filed on Aug. 10, 2021. The entirety of each of the above-mentioned patent applications is hereby incorporated by reference herein and made a part of this specification.

BACKGROUND

Technical Field

The disclosure relates to a video transmission system, and more particularly, to an optical transmission system and an optical matrix.

Description of Related Art

In the operation of the hospital, surgery has become the main source of income for the hospital. In order to improve the quality of surgery, various hospitals have invested a high cost to purchase sophisticated operating room instruments/equipment.

Generally speaking, when doctors perform the surgery, they often use auxiliary medical video systems (such as endoscopy systems, surgical navigation systems, angiography systems, and Da Vinci robots, etc.). In order to achieve better auxiliary effect, most of the above medical video systems need to meet the requirements such as high transmission speed, high real-time, long-distance transmission, low attenuation, good quality, and mutual transmission.

However, in the conventional technology, the system architecture used to transmit the video captured by a video source (such as an endoscope) to the screen for the doctor to view not only has a complicated switching relationship, but also easily causes the time latency of the video transmission. As a result, the risk of surgery is increased.

Therefore, for those skilled in the art, how to design a low-complexity and low-latency medical video transmission architecture is indeed an important issue.

SUMMARY

In view of this, the disclosure provides an optical transmission system and an optical matrix, which may be used to solve the above technical issues.

The disclosure provides an optical transmission system, which includes a first optical transmitter, an optical matrix, and a first optical receiver. The first optical transmitter receives a first video electrical signal corresponding to a first video standard, and converts the first video electrical signal into a first optical signal at a specified transmission rate. The optical matrix is connected to the first optical transmitter, and is used to receive and forward the first optical signal. The first optical receiver is connected to the optical matrix, receives the first optical signal at the specified transmission rate forwarded by the optical matrix, and converts the first optical signal into a second video electrical signal corresponding to a second video standard.

The disclosure provides an optical matrix, which includes multiple input ends, multiple output ends, and a controller. A first input end of the input ends receives a first optical signal at a specified transmission rate from a first optical transmitter, and the first optical transmitter corresponds to a first video standard. The output ends include a first output end. A first corresponding relationship is configured between the first input end and the first output end, and the controller switches the first input end to be connected to the first output end according to the first corresponding relationship. The first corresponding relationship is a first image routing path. The first output end is used to output the first optical signal from the first input end to a first optical receiver, and the first optical signal is converted into a second video electrical signal by means of the first optical receiver converts and the second video electrical signal corresponds to a second video standard.

The disclosure provides an optical transmission system, which includes an optical transmitter and an optical receiver. The optical transmitter receives a first video electrical signal corresponding to a first video standard, and converts the first video electrical signal into a first optical signal at a specified transmission rate. The optical receiver receives the first optical signal at the specified transmission rate from the optical transmitter, and converts the first optical signal into a second video electrical signal corresponding to a second video standard.

DETAILED DESCRIPTION OF DISCLOSED EMBODIMENTS

Figure 1A:
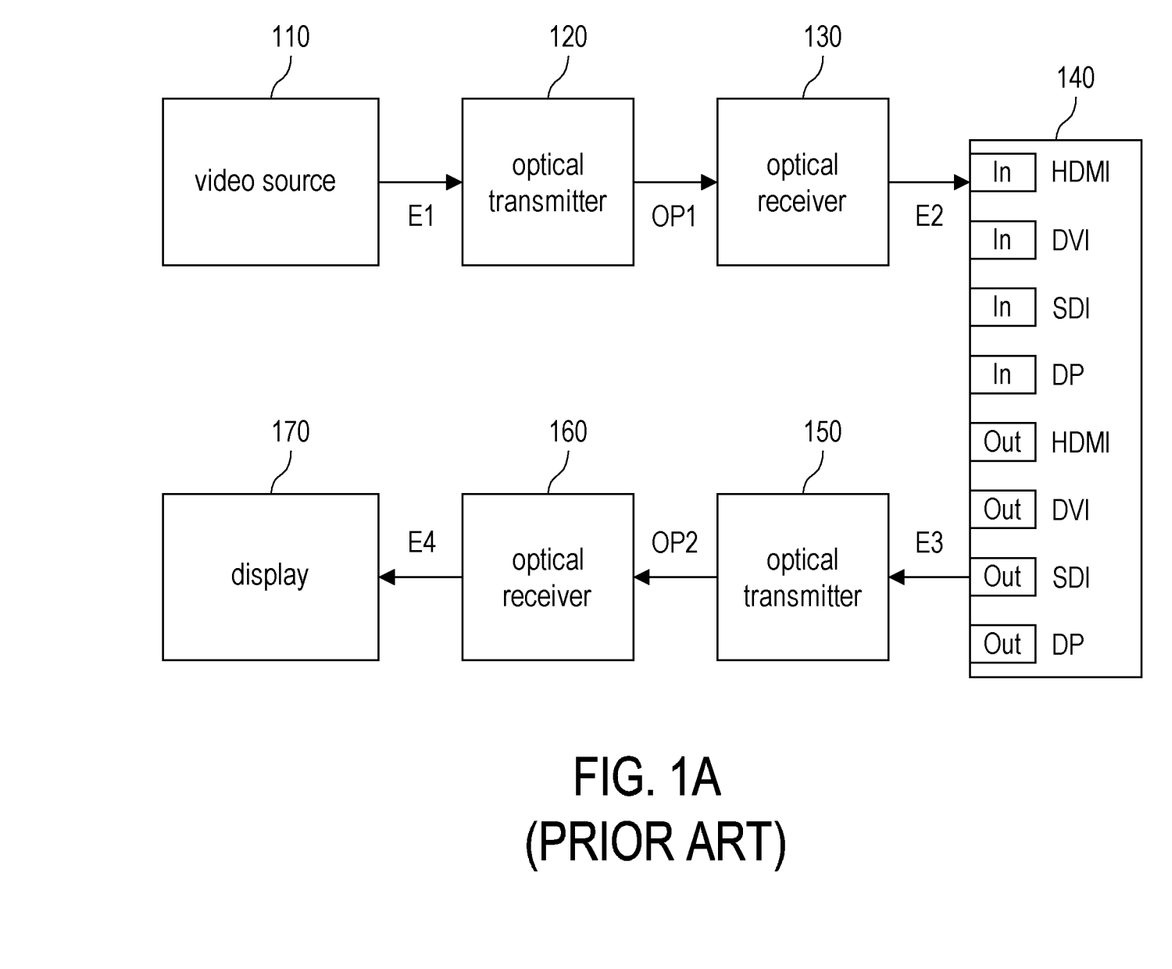
FIG. 1A is a conventional mechanism used for medical video transmission.

Referring to FIG. 1A, FIG. 1A is a conventional mechanism used for medical video transmission. In FIG. 1A, it is assumed that a video source 110 is an endoscope that may provide a high definition multimedia interface (HDMI) video, and a display 170 may be used for a doctor to view the video captured by the endoscope on a screen. For ease of description, hereinafter, it is assumed that the display 170 may receive a video signal through a serial digital interface (SDI) (that is, the video source 110 and the display 170 correspond to different video standards).

In general, in order for the display 170 to display the video captured by the video source 110 smoothly, an optical transmitter 120, an optical receiver 130, an optical transmitter 150, and an optical receiver 160 are required to be disposed in sequence between the video source 110 and the display 170.

In this case, when the video source 110 captures to obtain the video (for example, an endoscopic video), a corresponding electrical signal E1 may be provided to the optical transmitter 120. The optical transmitter 120 may correspondingly convert the electrical signal E1 into an optical signal OP1, and send the optical signal OP1 to the optical receiver 130.

In a scenario of FIG. 1A, since the video source 110 is assumed to be used to provide the HDMI video, a designer may connect the optical receiver 130 which is corresponding to the video source 110 to a HDMI input end of an electrical matrix 140 in advance when constructing an operating room environment. Therefore, after the optical receiver 130 receives the optical signal OP1, the optical receiver 130 may convert the optical signal OP1 into an electrical signal E2, and output the electrical signal E2 to the HDMI input end of the electrical matrix 140. In other examples, if the video source 110 is used to provide a digital visual interface (DVI) video or a display port (DP) video, the designer may change the optical receiver 130 to be connected to a DVI input end or DP input end of the electrical matrix 140.

In the above example, since the display 170 is assumed to correspond to an SDI standard, the corresponding optical transmitter 150 may be connected to a SDI output end of the electrical matrix 140 in advance by the designer. In this case, when the electrical matrix 140 receives the electrical signal E2, the electrical matrix 140 may convert the electrical signal E2 into an electrical signal E3 which is corresponding to the SDI standard, and provide the electrical signal E3 to the optical transmitter 150.

Afterwards, the optical transmitter 150 may convert the electrical signal E3 into an optical signal OP2, and provide the optical signal OP2 to the optical receiver 160. Correspondingly, the optical receiver 160 may convert the optical signal OP2 into an electrical signal E4, and provide the electrical signal E4 to the display 170, so that the display 170 may display the video captured by the video source 110.

It can be seen from FIG. 1A that in an architecture that is shown, a set of optical transmitters/optical receivers need to be separately provided for the video source 110 and the display 170. Therefore, two sets of optical transmitters/optical receivers are necessary to be provided. In addition, signal source connectors corresponding to different video standards are also different. Therefore, in addition to the higher cost and the more complicated switching relationship, such method also causes a corresponding time latency due to multiple optical/electric signal conversions.

In addition, in order for the electrical matrix 140 to convert the electrical signal E2 corresponding to an HDMI standard into the electrical signal E3 corresponding to the SDI standard, the electrical matrix 140 also needs to perform a more complicated operation.

Figure 1B:
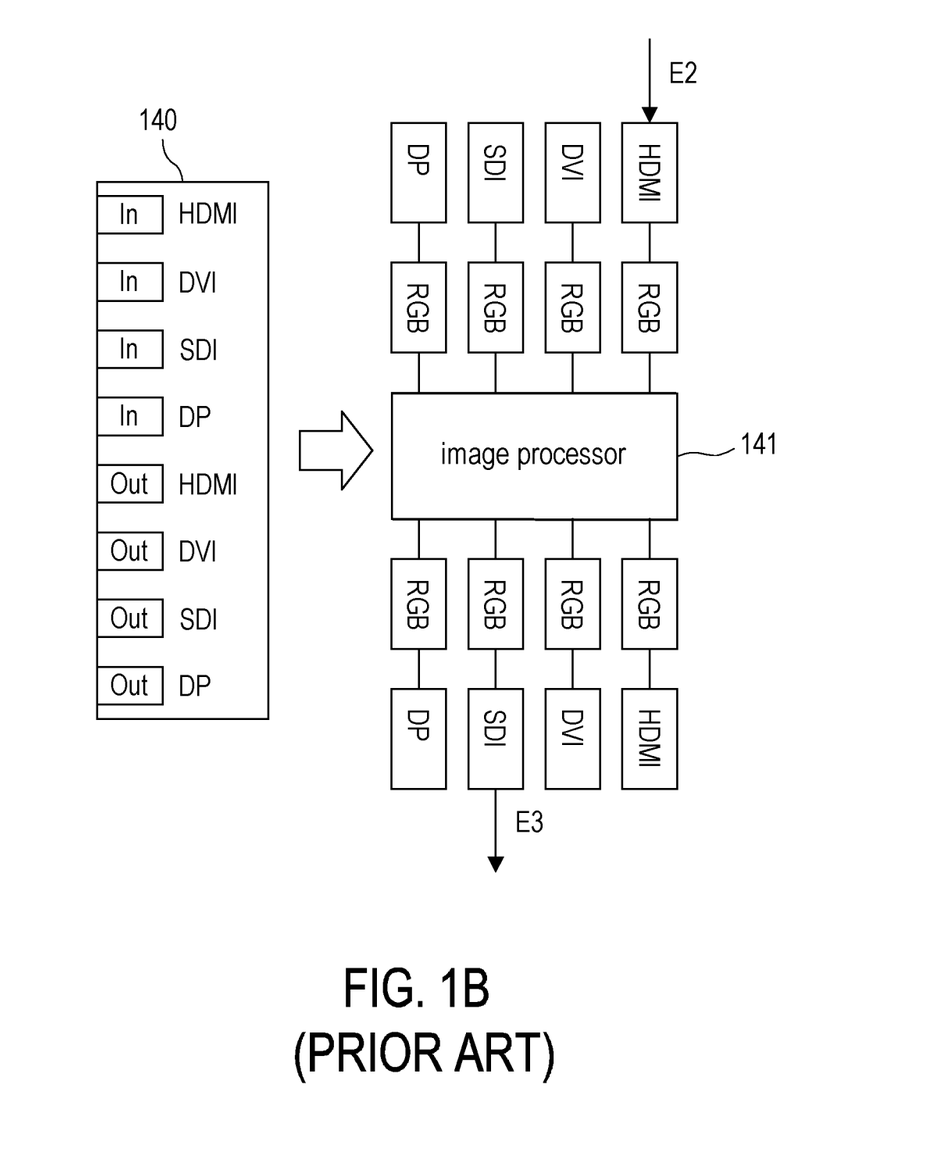
FIG. 1B is an architecture of an electrical matrix of FIG. 1A.

Referring to FIG. 1B, FIG. 1B is an architecture of an electrical matrix of FIG. 1A. In FIG. 1B, when the electrical matrix 140 receives the electrical signal E2 from the input end corresponding to the HDMI standard, the electrical signal E2 needs to be decoded to RGB-level raw data before the raw data may be encoded into the electrical signal E3 corresponding to the SDI standard through an image processor 141 of the electrical matrix 140. In this case, a conversion operation performed by the electrical matrix 140 also introduce other time latencies. Moreover, since the cost of the electrical matrix 140 is as high as tens of thousands of dollars, the implementation cost of the architecture of FIG. 1A remains high.

In addition, it is measured that the architecture of FIG. 1A causes a time latency of about 0.3 seconds in an image viewed by the doctor from the display 170. In this case, assuming that it takes 10 minutes for the video source 110 to enter a stomach from a mouth of a patient, this will cause a total time latency of 3.3 minutes in the image viewed by the doctor on the display 170. As a result, the risk of a surgery is increased, accordingly.

In view of this, the disclosure provides a novel optical transmission system, which may be used to solve the above technical issues.

Figure 2:
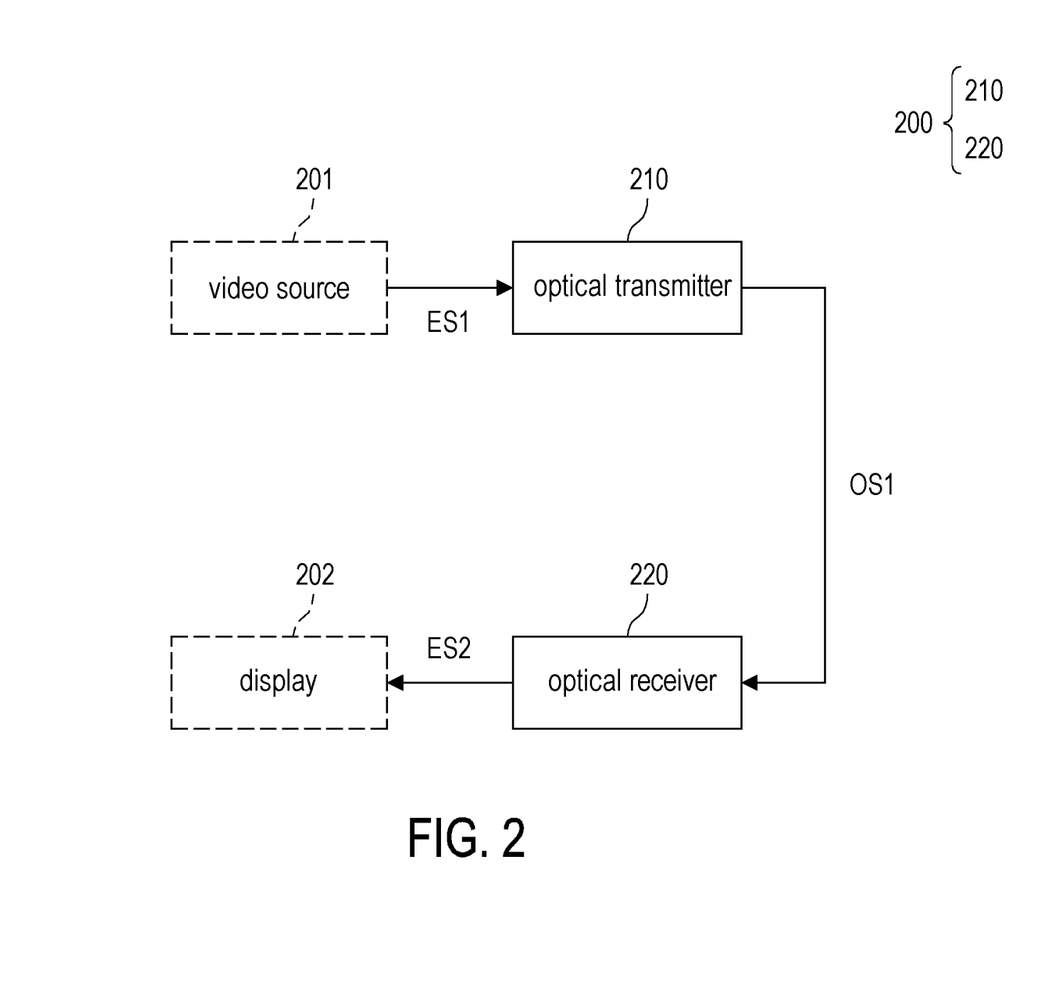
FIG. 2 is a multi-interface direct optical transmission system according to an embodiment of the disclosure.

Referring to FIG. 2, FIG. 2 is a direct optical transmission system according to an embodiment of the disclosure. As shown in FIG. 2, an optical transmission system 200 includes an optical transmitter 210 and an optical receiver 220. The optical transmitter 210 may be connected between a video source 201 and the optical receiver 220, and the optical receiver 220 may be connected to a display 202.

In the embodiment of the disclosure, the video source 201 may correspond to a first video standard, and the display 202 may correspond to a second video standard. In different embodiments, the first video standard may be the same as or different from the second video standard. In some embodiments, the first video standard corresponding to the video source 201 may be, for example, one of the HDMI standard, a DVI standard, a DP standard, and the SDI standard. However, the disclosure may be not limited thereto. In addition, the second video standard corresponding to the display 202 may also be one of the HDMI standard, the DVI standard, the DP standard, and the SDI standard. However, the disclosure may be not limited thereto.

In an embodiment, after the video source 201 (for example, the endoscope) captures to generate a corresponding video electrical signal ES1, the video source 201 may transmit the video electrical signal ES1 to the optical transmitter 210.

Correspondingly, after the optical transmitter 210 receives the video electrical signal ES1, the optical transmitter 210 may convert the video electrical signal ES1 into an optical signal OS1 at a specified transmission rate, and transmit the optical signal OS1 to the optical receiver 220. In some embodiments, the optical transmitter 210 may losslessly convert the video electrical signal ES1 into the optical signal OS1 at the specified transmission rate. That is, the optical transmitter 210 may convert the video electrical signal ES1 into the optical signal OS1 at the specified transmission rate without compression. However, the disclosure may be not limited thereto.

In different embodiments, the above specified transmission rate may be between 9.984 Gbps and 10.2 Gbps. In an exemplary embodiment, the above specified transmission rate may be 10 Gbps. However, the disclosure may be not limited thereto.

After the optical receiver 220 receives the optical signal OS1 at the specified transmission rate from the optical transmitter 210, the optical receiver 220 may convert the optical signal OS1 into a video electrical signal ES2 corresponding to the second video standard, and output the video electrical signal ES2 to the display 202 corresponding to the second video standard. In this way, the display 202 may present an image captured by the video source 201.

Furthermore, the optical transmitter 210 is designed to convert the video electrical signal ES1 corresponding to the first video standard into the optical signal OS1 at the specified transmission rate, and the optical receiver 220 is also correspondingly designed to convert the optical signal OS1 at the specified transmission rate into the video electrical signal ES2 corresponding to the second video standard. Therefore, even if the video source 201 and the display 202 correspond to different video standards, the optical signal OS1 provided by the optical transmitter 210 may be directly transmitted to the optical receiver 220 without any conversion.

In light of the above, compared with FIG. 1A in which the electrical matrix and the architecture of the two sets of optical transmitters/optical receivers are required, in FIG. 2, the same video transmission function as the architecture of FIG. 1A may be achieved when only a set of optical transmitter 210/optical receiver 220 is provided between the video source 201 and the display 202. Moreover, in addition to the lower complexity of the switching relationship in an architecture of FIG. 2, it may also achieve a lower time latency due to the reduction of the number of optical/electrical signal conversions.

It is measured that the time latency generated by the architecture of FIG. 2 is about 2 μs, which is only one over one hundred and fifty thousandth of that in the architecture of FIG. 1A. Moreover, without the need to dispose the electrical matrix with the cost of up to tens of thousands of dollars, the implementation cost of the architecture of FIG. 2 is also much lower than that of the architecture of FIG. 1A.

Figure 3A:
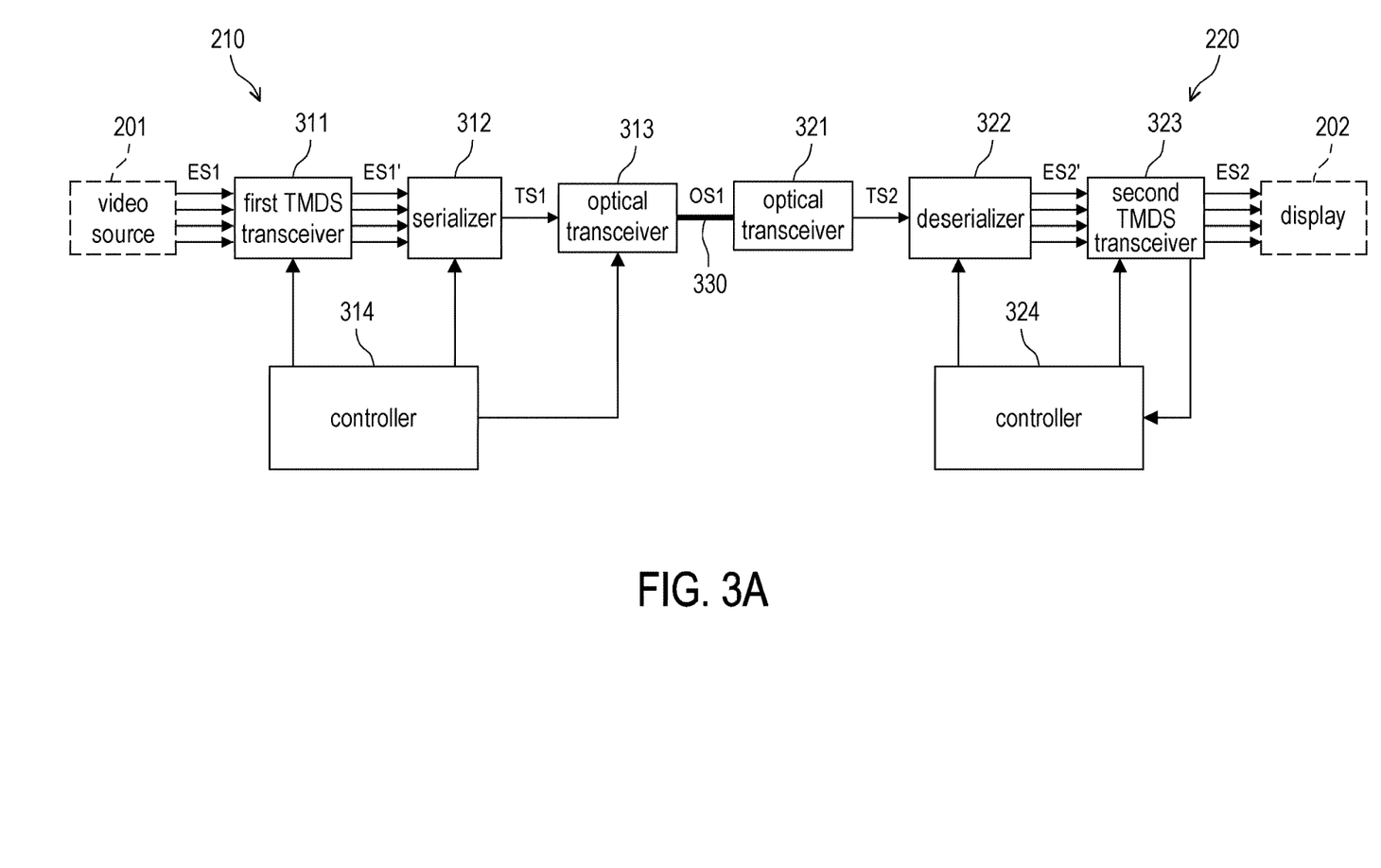
FIG. 3A is an architectural diagram of an optical transmitter and an optical receiver according to an embodiment of the disclosure.

Referring to FIG. 3A, FIG. 3A is an architectural diagram of an optical transmitter and an optical receiver according to an embodiment of the disclosure. In a scenario of FIG. 3A, it is assumed that the first video standard corresponding to the video source 201 is the HDMI standard or the DVI standard, and the second video standard corresponding to the display 202 is the HDMI standard or the DVI standard. In this case, the video electrical signal ES1 provided by the video source 201 is, for example, a transition minimized differential signaling (TMDS) signal (hereinafter, referred to as a first TMDS signal).

As shown in FIG. 3A, the optical transmitter 210 includes a first TMDS transceiver 311, a serializer 312, an optical transceiver 313, and a controller 314. In some embodiments, the first TMDS transceiver 311 may receive and clear noise in the first TMDS signal (i.e., the video electrical signal ES1) from the video source 201. Afterwards, the serializer 312 coupled to the first TMDS transceiver 311 may receive a cleared first TMDS signal ES1', and serialize the first TMDS signal ES1' into a first electrical serialized data signal, i.e., a first tandem signal TS1. In some embodiments, the serializer 312 may be configured to only output the first tandem signal at the specified transmission rate. In this case, no matter which image quality a video signal that the video electrical signal ES1 corresponds to has, the serializer 312 correspondingly generates the first tandem signal TS1 at the specified transmission rate. However, the disclosure may be not limited thereto. Next, the optical transceiver 313 coupled to the serializer 312 may convert the first tandem signal TS1 into the optical signal OS1 at the specified transmission rate. In FIG. 3A, the optical transmitter 210 may send the optical signal OS1 to the optical receiver 220 through an optical fiber 330 connected between the optical transmitter 210 and the optical receiver 220.

In different embodiments, the above operations performed by the first TMDS transceiver 311, the serializer 312, and the optical transceiver 313 may all be performed by the controller 314 coupled to the first TMDS transceiver 311, the serializer 312, and the optical transceiver 313 through corresponding control signals controlling the first TMDS transceiver 311, the serializer 312, and the optical transceiver 313. However, the disclosure may be not limited thereto. In some embodiments, the controller 314 may correspondingly enable the optical transceiver 313 after the first TMDS transceiver 311 and the serializer 312 are initialized, so as to prevent the optical transceiver 313 from accidentally sending meaningless data to the optical receiver 220. However, the disclosure may be not limited thereto.

As shown in FIG. 3A, the optical receiver 220 may include an optical transceiver 321, a deserializer 322, a second TMDS transceiver 323, and a controller 324. In some embodiments, the optical transceiver 321 may receive the optical signal OS1 from the optical transceiver 313 through the optical fiber 330, and convert the optical signal OS1 into a second electrical serialized data signal, i.e., a second tandem signal TS2. Afterwards, the deserializer 322 coupled to the optical transceiver 321 may deserialize the second tandem signal TS2 from the optical transceiver 321 into a second TMDS signal ES2'. Next, the second TMDS transceiver 323 coupled to the deserializer 322 may receive and clear noise in the second TMDS signal ES2', and output the cleared second TMDS signal ES2' as the video electrical signal ES2 to the display 202.

In different embodiments, the above operations performed by the optical transceiver 321, the deserializer 322, and the second TMDS transceiver 323 may all be performed by the controller 324 coupled to the optical transceiver 321, the deserializer 322, and the second TMDS transceiver 323 through the corresponding control signals controlling the optical transceiver 321, the deserializer 322, and the second TMDS transceiver 323. However, the disclosure may be not limited thereto.

Figure 3B:
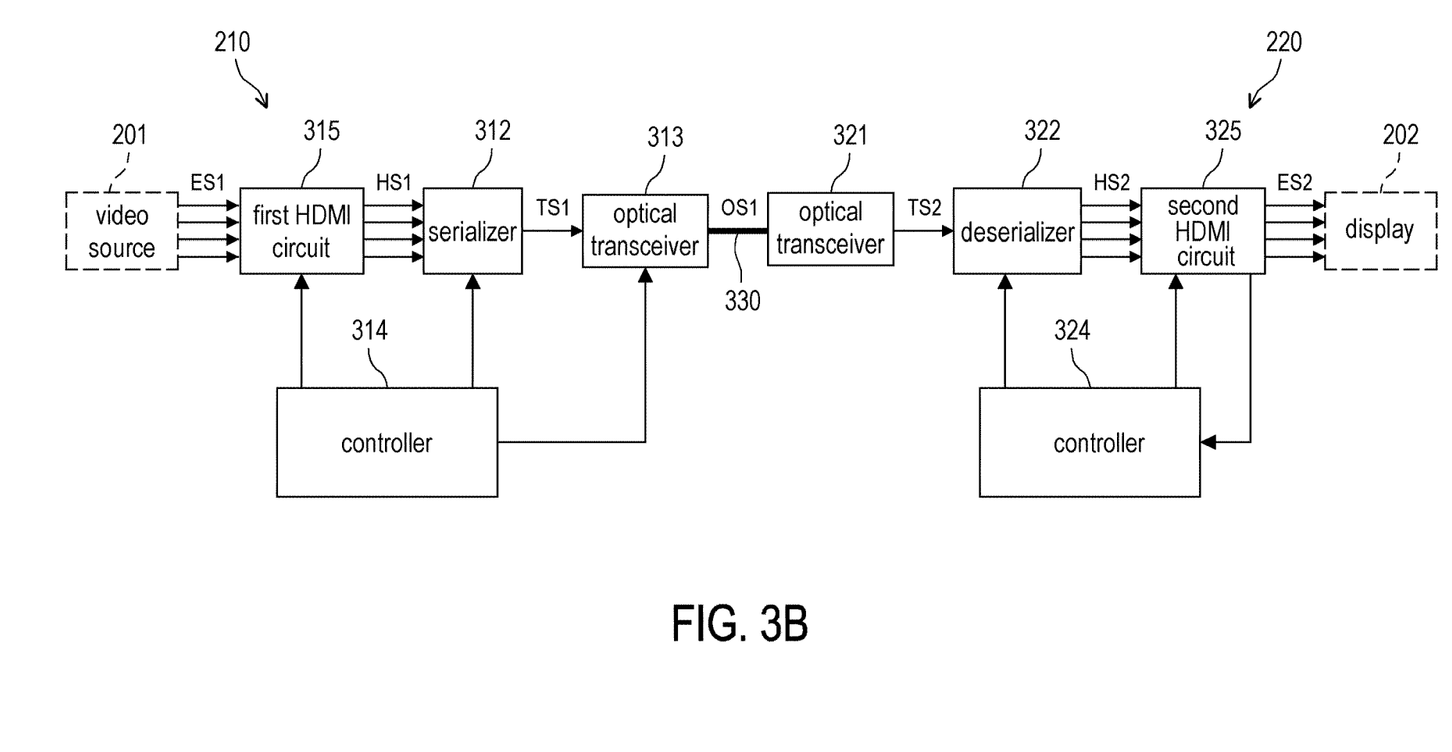
FIG. 3B is an architectural diagram of an optical transmitter and an optical receiver according to an embodiment of the disclosure.

Referring to FIG. 3B, FIG. 3B is an architectural diagram of an optical transmitter and an optical receiver according to an embodiment of the disclosure. In a scenario of FIG. 3B, it is assumed that the first video standard corresponding to the video source 201 is the SDI standard or the DP standard, and the second video standard corresponding to the display 202 is the SDI standard or the DP standard.

As shown in FIG. 3B, the optical transmitter 210 includes a first HDMI circuit 315, the serializer 312, the optical transceiver 313, and the controller 314. In some embodiments, the first HDMI circuit 315 may receive the video electrical signal ES1, and convert the video electrical signal ES1 into a first HDMI signal HS1. Afterwards, the serializer 312 coupled to the first HDMI circuit 315 may receive the first HDMI signal HS1, and serialize the first HDMI signal HS1 into the first tandem signal TS1. In some embodiments, the serializer 312 may be configured to only output the first tandem signal TS1 at the specified transmission rate. In this case, no matter which image quality the video signal that the video electrical signal ES1 corresponds to has, the serializer 312 correspondingly generates the first tandem signal TS1 at the specified transmission rate. However, the disclosure may be not limited thereto. Next, the optical transceiver 313 coupled to the serializer 312 may convert the first tandem signal TS1 into the optical signal OS1 at the specified transmission rate. In FIG. 3B, the optical transmitter 210 may send the optical signal OS1 to the optical receiver 220 through the optical fiber 330 connected between the optical transmitter 210 and the optical receiver 220.

In different embodiments, the above operations performed by the first HDMI circuit 315, the serializer 312, and the optical transceiver 313 may all be performed by the controller 314 coupled to the first HDMI circuit 315, the serializer 312, and the optical transceiver 313 through the corresponding control signals controlling the first HDMI circuit 315, the serializer 312, and the optical transceiver 313. However, the disclosure may be not limited thereto. In some embodiments, the controller 314 may correspondingly enable the optical transceiver 313 after the first HDMI circuit 315 and the serializer 312 are initialized, so as to prevent the optical transceiver 313 from accidentally sending the meaningless data to the optical receiver 220. However, the disclosure may be not limited thereto.

As shown in FIG. 3B, the optical receiver 220 may include the optical transceiver 321, the deserializer 322, a second HDMI circuit 325, and the controller 324. In some embodiments, the optical transceiver 321 may receive the optical signal OS1 from the optical transceiver 313 through the optical fiber 330, and convert the optical signal OS1 into the second tandem signal TS2. Afterwards, the deserializer 322 coupled to the optical transceiver 321 may deserialize the second tandem signal TS2 from the optical transceiver 321 into a second HDMI signal HS2. Next, the second HDMI circuit 325 coupled to the deserializer 322 may receive the second HDMI signal HS2, and convert the second HDMI signal HS2 into the video electrical signal ES2 to be output to the display 202.

In different embodiments, the above operations performed by the optical transceiver 321, the deserializer 322, and the second HDMI circuit 325 may all be performed by the controller 324 coupled to the optical transceiver 321, the deserializer 322, and the second HDMI circuit 325 through the corresponding control signals controlling the optical transceiver 321, the deserializer 322, and the second HDMI circuit 325. However, the disclosure may be not limited thereto.

In other embodiments, in response to the first video standard corresponding to the video source 201 and the second video standard corresponding to the display 202, the optical transmitter 210 of FIG. 3A may be arbitrarily combined with the optical receiver 220 of FIG. 3A or the optical receiver 220 of FIG. 3B. Similarly, the optical transmitter 210 of FIG. 3B may also be arbitrarily combined with the optical receiver 220 of FIG. 3A or the optical receiver 220 of FIG. 3B.

For example, assuming that the video source 201 and the display 202 respectively correspond to the HDMI standard and the SDI standard, the video source 201 may be connected to the display 202 through the optical transmitter 210 of FIG. 3A, the optical fiber 330, and the optical receiver 220 of FIG. 3B in sequence. For another example, assuming that the video source 201 and the display 202 respectively correspond to the SDI standard and the HDMI standard, the video source 201 may be connected to the display 202 through the optical transmitter 210 of FIG. 3B, the optical fiber 330, and the optical receiver 220 of FIG. 3A in sequence. For still another example, assuming that the video source 201 and the display 202 respectively correspond to the DP standard and the DVI standard, the video source 201 may be connected to the display 202 through the optical transmitter 210 of FIG. 3B, the optical fiber 330, and the optical receiver 220 of FIG. 3A in sequence.

In addition, in some embodiments, the disclosure further provides an optical matrix, which may be used to route optical signals between multiple sets of video sources and displays. As a result, a more diversified video transmission mechanism is achieved, which are described in detail as follows.

Figure 4:
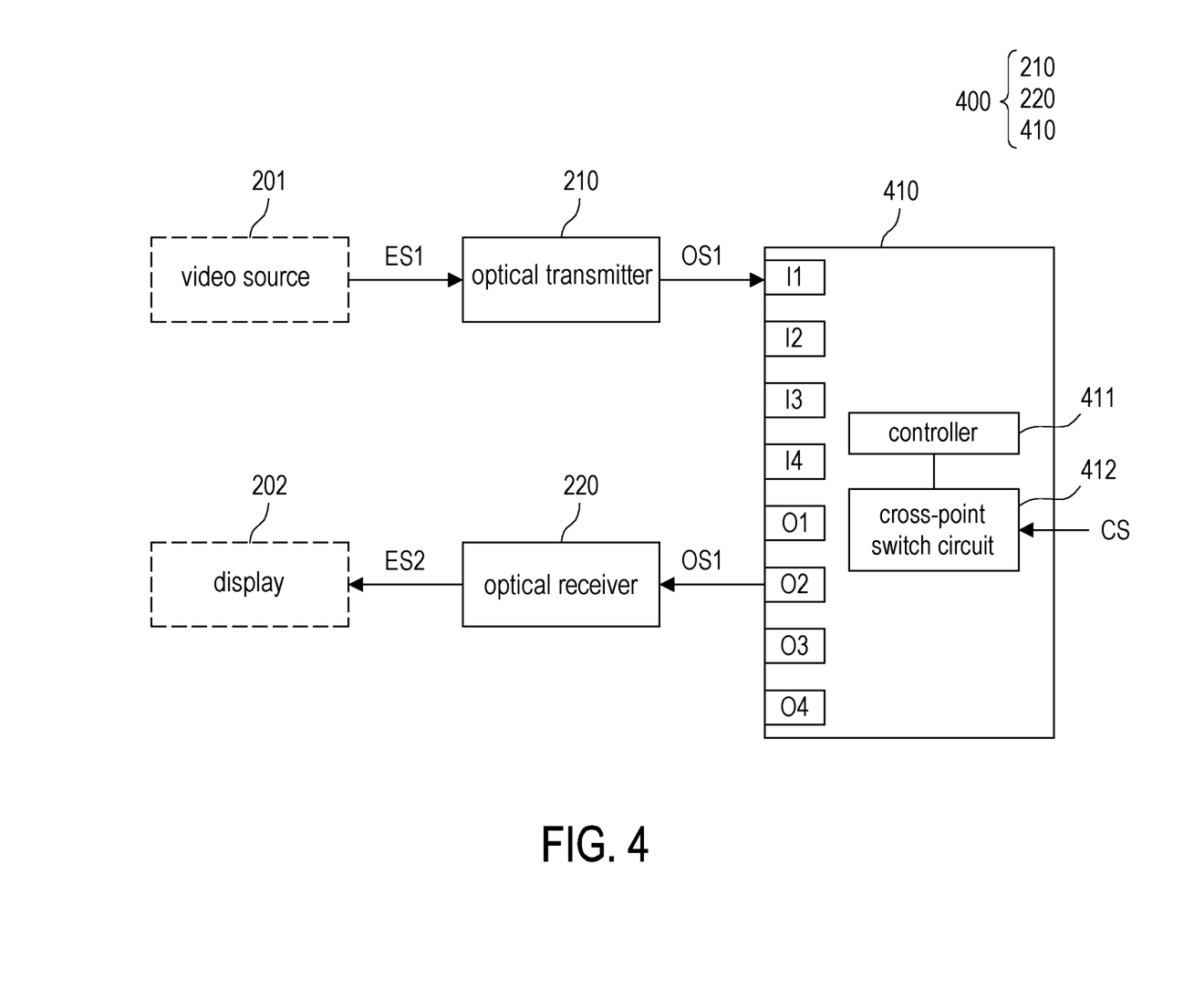
FIG. 4 is a schematic diagram of an optical transmission system according to an embodiment of the disclosure.

Referring to FIG. 4, FIG. 4 is a schematic diagram of an optical transmission system according to an embodiment of the disclosure. In FIG. 4, an optical transmission system 400 includes the optical transmitter 210, the optical receiver 220, and an optical matrix 410. Details of the optical transmitter 210 and the optical receiver 220 may refer to the description in the previous embodiment. Therefore, the same details will not be further reiterated in the following.

As shown in FIG. 4, the optical matrix 410 may include multiple input ends I1 to I4, multiple output ends O1 to O4, a controller 411, and a cross-point switch circuit 412. For ease of description, hereinafter, it is assumed that the optical transmitter 210 is connected to the input end I1, and the optical receiver 220 is connected to the output end O2. However, the disclosure may be not limited thereto.

In an embodiment, since the display 202 is assumed to be used to display the video captured by the video source 201, a first corresponding relationship may be configured between the input end I1 and the output end O2 corresponding to the video source 201 and the display 202. In this case, the controller 411 may switch the input end I1 to be connected to the output end O2 according to the first corresponding relationship between the input end I1 and the output end O2. The first corresponding relationship is a first image routing path.

Therefore, after the optical transmitter 210 sends the optical signal OS1 at the specified transmission rate to the input end I1, the input end I1 may directly forward the optical signal OS1 to the output end O2, and the output end O2 may correspondingly output the optical signal OS1 to the optical receiver 220.

In other words, after the optical matrix 410 receives the optical signal OS1 from the optical transmitter 210 through the input end I1, the optical matrix 410 may directly output the optical signal OS1 to the optical receiver 220 through the output end O2 corresponding to the input end I1 without performing any processing/conversion on the optical signal OS1. Therefore, compared with the electrical matrix 140 of FIG. 1A, the optical matrix 410 of FIG. 4 may complete signal transmission with a lower time latency.

Moreover, compared with the price of the electrical matrix 140 that may easily be tens of thousands of dollars, the optical matrix 410 only costs about thousands of dollars. Therefore, the implementation cost is much lower than that of the electrical matrix 140.

In some embodiments, the designer may remotely set the corresponding relationship between the input ends I1 to I4 and the output ends O1 to O4 through a network. The corresponding relationship is an image routing path. For example, after determining that the input end I1 needs to correspond to the output end O2, the designer may run a control software corresponding to the optical matrix 410 on a computer device that the designer is operating, and edit the first corresponding relationship between the input end I1 and the output end O2 on the control software. After completing the setting of the first corresponding relationship, the computer device may send a corresponding configuration signal CS to the optical matrix 410 through the network. The first corresponding relationship is the first image routing path.

Correspondingly, the cross-point switch circuit 412 coupled to the controller 411 may receive the configuration signal CS from the network, and the controller 411 may switch the first corresponding relationship between the input end I1 and the output end O2 based on the configuration signal CS, and then switch the input end I1 to be connected to the output end O2 according to the first corresponding relationship.

In other embodiments, the optical matrix 410 may further provide a control panel for the designer to manually set the corresponding relationship between the input ends I1 to I4 and the output ends O1 to O4. The corresponding relationship is an image routing path. In some embodiments, the control panel may include multiple LED buttons corresponding to the input ends I1 to I4 and the output ends O1 to O4. Based on this, after determining that the input end I1 needs to correspond to the output end O2, the designer may find out the LED button corresponding to the input end I1 on the control panel (hereinafter, referred to as a first LED button), and find out the LED button corresponding to the output end O2 (hereinafter, referred to as a second LED button).

Afterwards, the designer may set the first LED button to correspond to the second LED button, and the controller 411 may accordingly switch the first corresponding relationship between the input end I1 and the output end O2, and then switch the input end I1 to be connected to the output end O2 according to the first corresponding relationship. However, the disclosure may be not limited thereto.

In other embodiments, the optical matrix 410 may provide a more complex routing function, and details thereof are described below.

Figure 5:
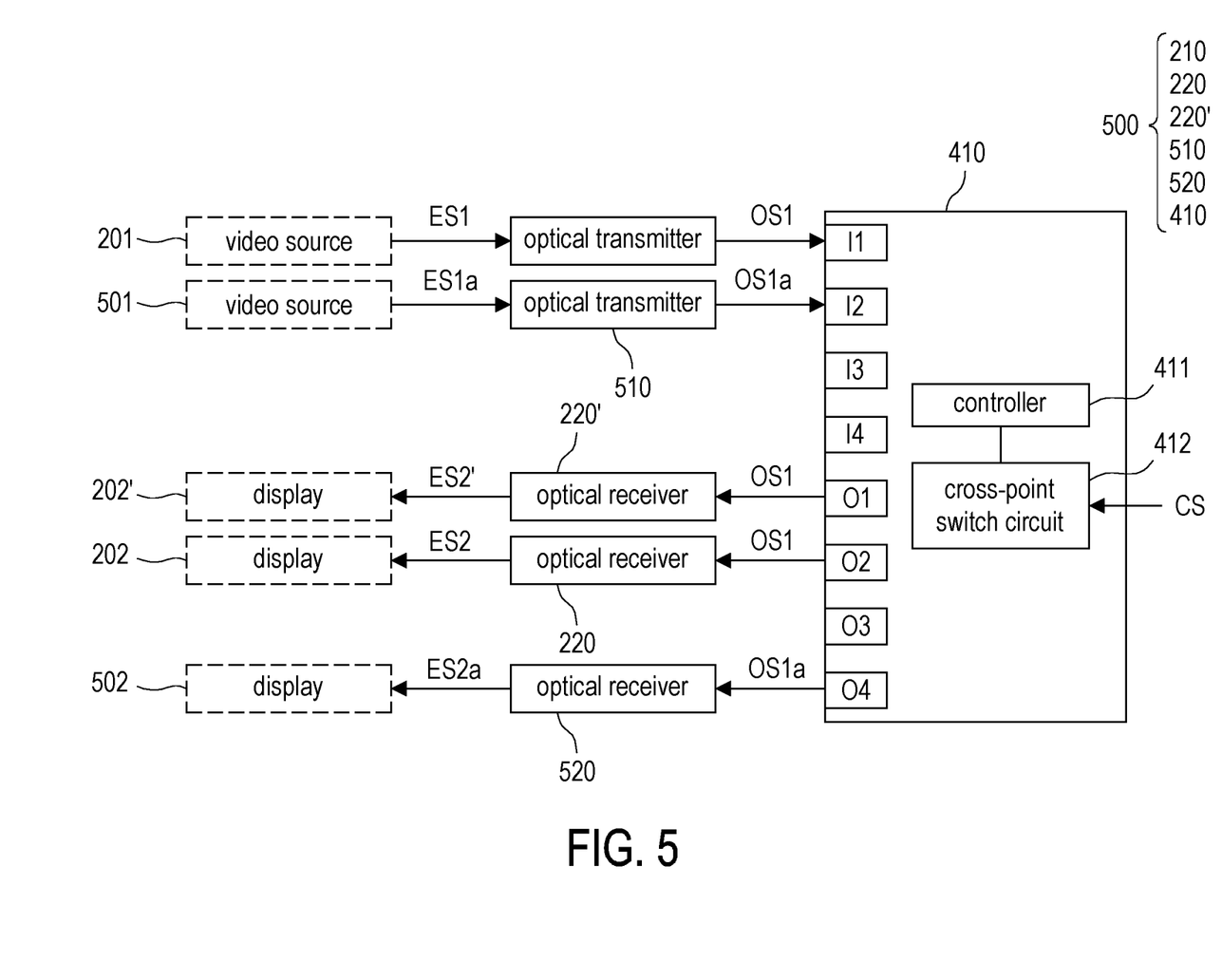
FIG. 5 is a schematic diagram of the optical transmission system of FIG. 4.

Referring to FIG. 5, FIG. 5 is a schematic diagram of the optical transmission system of FIG. 4. As shown in FIG. 5, an optical transmission system 500 includes the optical transmitter 210, the optical receiver 220, an optical receiver 220', an optical transmitter 510, an optical receiver 520, and the optical matrix 410.

In FIG. 5, in addition to the first corresponding relationship between the input end I1 and the output end O2, a second corresponding relationship may be further configured between the input end I1 and the output end O1. In this case, the controller 411 may switch the input end I1 to be connected to the output end O1 according to the second corresponding relationship. In other words, the input end I1 may be connected to the output ends O1 and O2 at the same time. The second corresponding relationship is a second image routing path.

Based on this, after the optical transmitter 210 sends the optical signal OS1 at the specified transmission rate to the input end I1, the input end I1 may directly forward the optical signal OS1 to the output ends O1 and O2. Correspondingly, the output end O1 may output the optical signal OS1 to the optical receiver 220' connected to the output end O1, and the output end O2 may output the optical signal OS1 to the optical receiver 220 connected to the output end O2.

After the optical receiver 220' receives the optical signal OS1, the optical receiver 220' may perform the operation similar to the optical receiver 220, so as to convert the optical signal OS1 into a video electrical signal ES2' (which corresponds to a third video standard) for a display 202' to display the video captured by the video source 201.

In a scenario of FIG. 5, the display 202' may correspond to the third video standard, and the third video standard may be the same as or different from the first video standard and the second video standard. For example, assuming that the first video standard and the second video standard are respectively the HDMI standard and the SDI standard, the third video standard may be any one of the HDMI standard, the SDI standard, the DP standard, and the DVI standard. Correspondingly, the optical receiver 220' may be used to convert the optical signal OS1 into the video electrical signal ES2' corresponding to the third video standard for the display 202' to present.

In short, the optical matrix 410 may broadcast the optical signal OS1 from the optical transmitter 210 to the output ends O1 and O2 based on the first corresponding relationship and the second corresponding relationship, so that the corresponding displays 202 and 202' may both present a video image captured by the video source 201. However, the disclosure may be not limited thereto.

In addition, assuming that a display 502 may be used to display a video captured by a video source 501, the designer may establish the third corresponding relationship between the input end I2 and the output end O4 after respectively connecting the corresponding optical transmitter 510 and the corresponding optical receiver 520 to the selected input end (for example, the input end I2) and the selected output end (for example, the output end O4). In this case, the controller 411 may switch the input end I2 to be connected to the output end O4 according to the third corresponding relationship between the input end I2 and the output end O4. The third corresponding relationship is a third image routing path.

In an embodiment, the video source 501 may correspond to a fourth video standard, and the display 502 may correspond to a fifth video standard. In different embodiments, the fourth video standard may be the same as or different from the fifth video standard. In some embodiments, the fourth video standard corresponding to the video source 501 may be, for example, one of the HDMI standard, the DVI standard, the DP standard, and the SDI standard. However, the disclosure may be not limited thereto. In addition, the fifth video standard corresponding to the display 502 may also be one of the HDMI standard, the DVI standard, the DP standard, and the SDI standard. However, the disclosure may be not limited thereto.

In an embodiment, after the video source 501 captures to generate a corresponding video electrical signal ES1a, the video source 501 may transmit the video electrical signal ES1a to the optical transmitter 510.

Correspondingly, after the optical transmitter 510 receives the video electrical signal ES1a, the optical transmitter 510 may convert the video electrical signal ES1a (which corresponds to the fourth video standard) into an optical signal OS1a at the specified transmission rate, and transmit the optical signal OS1a to the input end I2. Afterwards, the input end I2 of the optical matrix 410 may directly forward the optical signal OS1a to the output end O4, and the output end O4 may correspondingly output the optical signal OS1a to the optical receiver 520.

After the optical receiver 520 receives the optical signal OS1a at the specified transmission rate from the output end O4, the optical receiver 520 may convert the optical signal OS1a into a video electrical signal ES2a corresponding to the fifth video standard, and output the video electrical signal ES2a to the display 502 corresponding to the fifth video standard. In this way, the display 502 may present an image captured by the video source 501.

In light of the above, after the optical matrix 410 receives the optical signal OS1a from the optical transmitter 510 through the input end I2, the optical matrix 410 may also directly output the optical signal OS1a to the optical receiver 520 through the output end O4 corresponding to the input end I2 without performing any processing/conversion on the optical signal OS1a, and a time latency during this process is also much lower than that of the electrical matrix 140 in FIG. 1A.

In other embodiments, the designer may freely configure other combinations of the video source/display/optical transmitter/optical receiver according to the concept taught in FIG. 5, and the disclosure is not limited to the aspect shown in FIG. 5.

In addition, although the optical matrix 410 is shown as including the four input ends I1 to I4 and the four output ends O1 to O4 in FIGS. 4 and 5, the embodiments of the disclosure may not be limited thereto. In other embodiments, those skilled in the art may adjust the optical matrix 410 to have the input ends and the output ends that have any number according to requirements.

Based on the above, in the optical transmission system of the disclosure, the optical transmitter is designed to convert the video electrical signal received from the video source into the optical signal at the specified transmission rate. Correspondingly, the optical receiver is also designed to convert the optical signal at the specified transmission rate into the video electrical signal corresponding to the video standard for the display to present the image captured by the video source. Therefore, even if the video source and the display correspond to different video standards, the optical signal provided by the optical transmitter may be directly transmitted to the optical receiver without any conversion. In this way, the process of (medical) video transmission may be effectively simplified, thereby reducing the cost, time latency and complexity.

In addition, by disposing the optical matrix in the optical transmission system, the optical signals (all of which have the specified transmission rate) may be routed between multiple sets of video sources/displays. Moreover, the optical matrix simply forwards the optical signal between the input end and the output end that have the corresponding relationship without additional signal processing/conversion. The corresponding relationship is an image routing path. Therefore, the time latency generated by routing may be effectively reduced, which may be achieved at a lower cost.

Although the disclosure has been described with reference to the above embodiments, it will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An optical transmission system, comprising:
   a first optical transmitter comprising a first serializer receiving a first video electrical signal corresponding to a first video standard, wherein the first serializer converts the first video electrical signal corresponding to the first video standard into a first electrical serialized data signal, and the first optical transmitter converts the first electrical serialized data signal into a first optical signal at a specified transmission rate;
   an optical matrix connected to the first optical transmitter, and used to receive and forward the first optical signal, wherein the optical matrix comprises:
   a plurality of input ends, wherein a first input end of the plurality of input ends is connected to the first optical transmitter, and receives the first optical signal at the specified transmission rate from the first optical transmitter;
   a plurality of output ends, wherein the plurality of output ends comprise a first output end;
   a controller, wherein a first corresponding relationship is configured between the first input end and the first output end, and the controller, based on the first corresponding relationship, directly outputs the first optical signal at the specified transmission rate to a first optical receiver through the first output end corresponding to the first input end, wherein the first output end is connected to the first optical receiver; and
   the first optical receiver comprising a first deserializer connected to the optical matrix, receiving the first optical signal at the specified transmission rate forwarded by the optical matrix, wherein the first optical receiver converts the first optical signal at the specified transmission rate into a second electrical serialized data signal, and the first deserializer of the first optical receiver converts the second electrical serialized data signal into a second video electrical signal corresponding to a second video standard.

2. The optical transmission system according to claim 1, wherein the first corresponding relationship is an image routing path.

3. The optical transmission system according to claim 1, wherein the plurality of output ends further comprise a second output end, a second corresponding relationship is configured between the first input end and the second output end, and the controller switches the first input end to be connected to the second output end according to the second corresponding relationship, wherein the second output end is used to output the first optical signal from the first input end to a second optical receiver, wherein the second optical receiver converts the first optical signal into a third video electrical signal corresponding to a third video standard.

4. The optical transmission system according to claim 3, wherein the first video standard is different from the third video standard.

5. The optical transmission system according to claim 1, wherein
   the plurality of input ends further comprise a second input end, and the second input end receives a second optical signal at the specified transmission rate from a second optical transmitter, wherein the second optical transmitter converts a fourth video electrical signal which corresponds to a fourth video standard into the second optical signal;
   the plurality of output ends further comprise a third output end, a third corresponding relationship is configured between the second input end and the third output end, and the controller switches the second input end to be connected to the third output end according to the third corresponding relationship, wherein the third output end is used to output the second optical signal from the second input end to a third optical receiver, wherein the third optical receiver converts the second optical signal into a fifth video electrical signal corresponds to a fifth video standard.

6. The optical transmission system according to claim 1, wherein the first video standard is the same as the second video standard.

7. The optical transmission system according to claim 1, wherein the first video standard is different from the second video standard.

8. The optical transmission system according to claim 1, wherein the first video standard and the second video standard each comprise one of a high definition multimedia interface (HDMI) standard, a digital visual interface (DVI) standard, a display port (DP) standard, and a serial digital interface (SDI) standard.

9. The optical transmission system according to claim 1, wherein the first optical receiver further outputs the second video electrical signal to a display corresponding to the second video standard.

10. The optical transmission system according to claim 1, wherein the first optical transmitter converts the first video electrical signal into the first optical signal at the specified transmission rate without compression.

11. The optical transmission system according to claim 1, wherein the first video standard comprises one of an HDMI standard and a DVI standard, and the first video electrical signal comprises a first transition minimized differential signaling (TMDS) signal, wherein the first optical transmitter further comprises:
   a first TMDS transceiver receiving and clearing noise in the first TMDS signal, wherein the first serializer is coupled to the first TMDS transceiver, receives the cleared first TMDS signal, and serializes the cleared first TMDS signal into a first electrical serialized data signal; and a first optical transceiver coupled to the first serializer, and converting the first electrical serialized data signal into the first optical signal at the specified transmission rate.

12. The optical transmission system according to claim 1, wherein the second video standard comprises one of an HDMI standard and a DVI standard, wherein the first optical receiver further comprises:

a second optical transceiver receiving the first optical signal, and converting the first optical signal into the second electrical serialized data signal, wherein the first deserializer is coupled to the second optical transceiver, and deserializes the second electrical serialized data signal from the second optical transceiver into a second TMDS signal; and a second TMDS transceiver coupled to the first deserializer, receiving and clearing noise in the second TMDS signal, and outputting the cleared second TMDS signal as the second video electrical signal.

13. The optical transmission system according to claim 1, wherein the first video standard comprises one of an SDI standard and a DP standard, and the first optical transmitter further comprises:

a first HDMI circuit receiving the first video electrical signal, and converting the first video electrical signal into a first HDMI signal;

the first serializer coupled to the first HDMI circuit, receiving the first HDMI signal, and serializing the first HDMI signal into a first electrical serialized data signal; and a first optical transceiver coupled to the first serializer, and converting the first electrical serialized data signal into the first optical signal at the specified transmission rate.

14. The optical transmission system according to claim 1, wherein the second video standard comprises one of an SDI standard and a DP standard, and the first optical receiver further comprises:

a second optical transceiver receiving the first optical signal, and converting the first optical signal into a second electrical serialized data signal;

the first deserializer coupled to the second optical transceiver, and deserializing the second electrical serialized data signal from the second optical transceiver into a second HDMI signal; and a second HDMI circuit coupled to the first deserializer, receiving the second HDMI signal, and converting the second HDMI signal into the second video electrical signal.

* * * * *